United States Patent [19]

Giddey et al.

[11] Patent Number: 4,882,181
[45] Date of Patent: Nov. 21, 1989

[54] COCOA BASED COMPOSITION FOR THE PREPARATION OF DRINKS BY DISSOLUTION IN WATER

[75] Inventors: Claude Giddey, Geneva; Guy Bunter, Carouge, both of Switzerland

[73] Assignee: Battelle Memorial Institute, Geneva, Switzerland

[21] Appl. No.: 151,185

[22] Filed: Feb. 1, 1988

Related U.S. Application Data

[63] Continuation of Ser. No. 882,522, Jul. 7, 1986, abandoned.

[30] Foreign Application Priority Data

Jul. 9, 1985 [CH] Switzerland ............................ 2974/85

[51] Int. Cl.$^4$ .............................................. A23G 1/00
[52] U.S. Cl. ......................................... 426/74; 426/593
[58] Field of Search ................... 426/593, 631, 74, 96, 426/97, 93, 584, 106, 443

[56] References Cited

U.S. PATENT DOCUMENTS

| | | | |
|---|---|---|---|
| 2,556,792 | 11/1949 | Boyles | 426/593 |
| 3,868,469 | 2/1975 | Chalin | 426/593 |
| 3,997,680 | 12/1976 | Chalin | 426/631 |
| 4,216,237 | 8/1980 | Smith | 426/631 |
| 4,271,142 | 6/1981 | Puglia | 426/593 |
| 4,435,363 | 3/1984 | Terink et al. | 426/593 |
| 4,704,292 | 11/1987 | Kattenberg | 426/565 |

*Primary Examiner*—Carolyn Padem
*Attorney, Agent, or Firm*—Cushman, Darby & Cushman

[57] ABSTRACT

Water-dispersible powder composition constituted by cocoa, sugars and a complex mixture of edible cations and anions which impart to the beverages prepared from the composition and water organoleptic "body" properties similar to that resulting from blending cocoa and sugar with ordinary milk.

9 Claims, No Drawings

COCOA BASED COMPOSITION FOR THE PREPARATION OF DRINKS BY DISSOLUTION IN WATER

This is a continuation of application Ser. No. 882,522 filed July 7, 1986, now abandoned.

BRIEF STATEMENT OF THE INVENTION

The present invention concerns a composition of water-soluble or water-dispersable solid substances which provides, when stirred with warm or cold water, a cocoa based drink of improved organoleptic properties. This composition is available in powder form and mixes instantaneously with water; it generally contains, by weight, 5–30 parts of soluble cocoa and 55–70 parts of sugar and/or other polysaccharides. Preferably, it further contains 10–15 parts of milk proteins, 1–5 parts of milk fats and 0.01 to 1 parts of flavoring materials, the total of these ingredients forming 85–95 parts of 100 parts by weight of the composition. The remaining ingredients will be described hereafter.

BACKGROUND OF THE INVENTION

The problem which had to be solved during the research work which preced the discovery of the present composition was to provide a cocoa drink with improved taste properties, namely a milkless instant cocoa drink whose organoleptic properties substantially approximate milk chocolate. It is indeed known that drinks of the "chocolate" or "cocoa breakfast" type which contain cocoa, sugar and milk (the latter being provided by using either milk powder or new milk) have organoleptic properties, such as taste, texture, body and smoothness which were, until now, impossible to achieve without a substantial amount of milk constituents, i.e. using simply water.

Yet, it is now possible, to obtain a cocoa drink whose taste properties approximate that of milk-chocolate drinks substantially better than all instant cocoa products known to date. This result was achieved by an appropriate quantity of food permissible mineral salts and with a minimum of milk proteins. Thus, for instance, a conventional milk-chocolate drink contains usually about 220–250 g/l of dissolved substances. Taking into account that, in this case, the proportion of sugars plus cocoa solids amounts to only about 70 to 90 g of dissolved solids, it is recognized that the quantity of plain milk dry solids is relatively very high (100–150 g/l). Now, in the present invention, very interesting results are achieved with much lower quantities of total dry substances (of the order of 100–150 g/l) which represents substantial weight and volume savings, even when optionally using additional milk fats and milk proteins. The dry powder composition of the present invention contains by weight 5 to 30 parts of soluble cocoa and 55 to 70 parts of sugar or other sweetening carbohydrates, with additional ingredients to made 100% by weight including a mixture of mineral salts containing, K 16.8–23.2 wt. %, Cl 18.1–25.1 wt. %, $PO_4$ 12.6–16.8 wt. %, $CO_3$ 1.3–2.17 wt. %, $SO_4$ 1.10–1.65 wt. %, Na 5.4–7.0 wt. %, citrate 23.3–30.2 wt. %, Ca 5.42–6.86 wt. % and Mg 1.79–2.81 wt. %, the mixture providing a buffering action at pH 5.8–6.5 when it is dissolved in water.

DETAILED DESCRIPTION OF THE INVENTION

For achieving the mineral salts mixture used in the present composition, one preferably uses salts easily available commercially and the edibility of which is recognized from being included in many foodstuffs of vegetable or animal origin (vegetables, fruits, milk, etc.). A listing of such salts includes the following salts in % by weight: potassium chloride 7–10; potassium phosphate 18–24; potassium carbonate 3–5; potassium sulphate 2–3; tripotassium citrate 14–18; tricalcium citrate 20–26 calcium chloride 15–19 and magnesium chloride 7–11.

Generally, the present composition is an intimate blend of finely ground components. Indeed, with such kind of mixture, the various components rapidly dissolve in the required quantity of cold or hot water and the possible precipitation of some of the cations (for instance $Ca^{++}$ and $Mg^{++}$) by anions such as $PO_4^{-3}$, $CO_3^{-2}$ and $SO_4^{-2}$ is avoided.

As mentioned before, it is possible to further improve the present composition by the additional incorporation of 1 to 5 p.p.w. of powdered fats, for instance milk fats, and of flavors, for instance, vanilla, ginger, fruit flavors (banana, orange, black-currants, black-berries, etc.), liquor extracts (brandy, rhum, whisky); the amount of such flavors is about 0.5 to 3 g of aroma extract for 100 g of composition; lecithin can also be added.

Regarding the use of the present composition for the preparation of drinks, this is simply accomplished by measuring a predetermined quantity of powder and add the required quantity of water thereto; the dissolution is very fast and, consequently, the present composition is particularly suitable for automatic dispensers. Naturally, the blend also dissolves in milk which, although this is purely optional, also provides an excellent drink. The present composition can also contain pulverulent instant coffee in the proportion of about 0.5 to 5 g for 10 g of the composition as well as coca or cola extracts.

The present composition is prepared by intimately mixing together the aforementioned various ingredients in a standard type mixer or blender until a degree of granulometry fineness sufficient to ensure ready solubility or dispersibility in water is attained. The conditions necessary to achieve such results are standard and require no special skill.

The following examples illustrate the invention.

EXAMPLE 1

The following compositions (1 to 4) were prepared by intimately mixing the listed ingredients in a homogeneizer-blender apparatus used conventionally in the food industry.

|  | Compositions | | | |
|---|---|---|---|---|
|  | 1 | 2 | 3 | 4 |
| Ingredients (parts by weight) | | | | |
| Cocoa* | 14 | 15 | 17 | 14 |
| Sucrose | 57.5 | 58.5 | 45.5 | 54 |
| Glucose | — | — | 14 | — |
| Lactose | 6.43 | 5.44 | 6 | 6.43 |
| Lecithin | 0.5 | 0.5 | 0.45 | 0.5 |
| Concentrate of milk proteins** | 13 | 11 | 10 | 14 |
| Powdered fat*** | 3 | 3 | 2 | 4 |
| Aroma (vanillin) | 0.07 | 0.06 | 0.05 | 0.07 |
| Mixture of mineral salts**** | 5.5 | 6.5 | 5 | 7 |

-continued

|  | Compositions | | | |
|---|---|---|---|---|
|  | 1 | 2 | 3 | 4 |
| TOTAL | 100 | 100 | 100 | 100 |

*Containing 10% fat
**PL-80 (from the TRIBALLAT company). Other milk protein concentrates are also suitable, e.g. the products named MIPROTIN of the TONI MOLKEREI Company (ZH).
***BUMILOLA of TONI MOLKEREI
****The mineral salts mixtures correspond (for each composition) to the following %:

| Salts (% by weight) | | | | |
|---|---|---|---|---|
| KCl | 7.1 | 7.9 | 8.5 | 9.5 |
| $KH_2PO_4$ | 21 | 18 | 24 | 22 |
| $K_2CO_3$ | 3.2 | 3.3 | 4.1 | 4.1 |
| $K_2SO_4$ | 2.8 | 2.5 | 2 | 2 |
| Tripotassium citrate.$H_2O$ | 18 | 15 | 16 | 14 |
| Trisodium citrate.$2H_2O$ | 21 | 26 | 20.4 | 21.9 |
| $CaCl_2.2H_2O$ | 17.5 | 18.8 | 15 | 17 |
| $MgCl_2.6H_2O$ | 9.2 | 8.5 | 10 | 9.5 |
| TOTAL | 100 | 100 | 100 | 100 |

When the various ingredients listed above were finely ground and intimately blended together, drinks were prepared therewith by dissolving 120–130 g/l of the compositions 1 to 4 in hot or cold water. These drinks were submitted to experienced tasters who noted that they had a "body" which strongly resembled that of conventional milk-chocolate drinks and tested excellent.

EXAMPLE 2

Compositions 5 and 6 were prepared (as in Example 1) by mixing the following ingredients:

| Ingredients | Compositions | |
|---|---|---|
|  | 5 | 6 |
| Cocoa | 3.25 | 3.25 |
| Sugar | 8 | 6.5 |
| Lactose | — | 4 |
| Mineral salts (mixture identical with that used in composition 3) | 1 | 1 |
| TOTAL | 12.25 | 14.75 |

When the above compositions were dissolved in water (12–15 g/100 ml), beverages were obtained whose "body" was very similar to that of conventional cocoa beverages prepared with milk.

We claim:

1. A dry power composition of water-soluble solid substances for the preparation of a hot or cold cocoa drink by adding water thereto so as to provide a cocoa drink approximating the taste of milk-based chocolate drinks said composition, comprising by weight 5 to 30 parts of soluble cocoa and 55 to 70 parts of sugar or other sweetening carbohydrates, with additional ingredients to make 100% by weight including a mixture of mineral salts which comprises the following salts; in % by weight: KCl 7–10; $KH_2PO_4$ 18–24; $K_2CO_3$ 3–5; $K_2SO_4$ 2–3; tripotassium citrate 14–18; trisodium citrate 20–26; $CaCl_2$ 15–19; and $MgCl_2$ 7–11, this mixture providing a buffering action at pH 5.8–6.5 when the composition is dissolved for preparing the drink.

2. A method of using and the composition according to claim 1 for preparing a cocoa drink, wherein 100 to 150 g/l thereof is dissolved in water.

3. A dry powder composition of water-soluble solid substances for the preparation of a hot or cold cocoa drink by adding water thereto so as to provide a cocoa drink approximating the taste of milk-based chocolate drinks said composition, comprising by weight 5 to 30 parts of soluble cocoa and 55 to 70 parts of sugar or other sweetening carbohydrates, with additional ingredients to make 100% by weight including a mixture of mineral salts containing, K 16.8≧23.2 wt. %; Cl 18.1–25.1 wt. %, $PO_4$ 12.6–16.8 wt. %, $CO_3$ 1.3–2.17 wt. %, $SO_4$ 1.10–1.65 wt. %, Na 5.4–7.0 wt. %, citrate 23.3–30.2 wt. %, Ca 5.42–6.86 wt. % and Mg 1.79–2.81 wt. %, said mixture providing a buffering action at pH 5.8–6.5 when said composition is dissolved in water for preparing the drink.

4. Composition according to claim 3, further including 10–15 p.b.w. of milk proteins.

5. Composition according to claim 3, further including 1.5 to 4 p.b.w. of milk fats and 0.01 to 1 p.b.w. of flavoring ingredients.

6. Composition according to claim 3, wherein said the sweetening carbohydrates comprise glucose and lactose.

7. Composition according to claim 3, wherein all or part of said sweetening carbohydrates are replaced by other sweetening agents consisting of polyalcohols or synthetic sweeteners.

8. Composition according to claim 3, further including 0.5 to 5 g of pulverulent instant coffee per 10 g of the composition.

9. Composition according to claim 3, further including coca or cola extracts.

* * * * *